(12) United States Patent
Deegan et al.

(10) Patent No.: US 11,005,997 B1
(45) Date of Patent: May 11, 2021

(54) AUTOMATED CHATBOT TRANSFER TO LIVE AGENT

(71) Applicant: Wells Fargo Bank, N.A., San Francisco, CA (US)

(72) Inventors: Kristin H. Deegan, Sausalito, CA (US); Matthew G. Vanhouten, Moraga, CA (US); Uma Meyyappan, Freemont, CA (US); Jennifer Toby Whateley, Fremont, CA (US); Balinder Singh Mangat, Castro Valley, CA (US); Upul D. Hanwella, San Francisco, CA (US); Kimarie Pike Matthews, Burlingame, CA (US); Maria J. Latorre, Alameda, CA (US); Scott Edward Pitchford, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 231 days.

(21) Appl. No.: 15/933,020

(22) Filed: Mar. 22, 2018

Related U.S. Application Data

(60) Provisional application No. 62/475,681, filed on Mar. 23, 2017.

(51) Int. Cl.
| | |
|---|---|
| *G06F 15/16* | (2006.01) |
| *H04M 3/51* | (2006.01) |
| *H04L 12/58* | (2006.01) |
| *G06F 40/30* | (2020.01) |
| *G06F 40/295* | (2020.01) |

(52) U.S. Cl.
CPC ........ *H04M 3/5191* (2013.01); *G06F 40/295* (2020.01); *G06F 40/30* (2020.01); *H04L 51/02* (2013.01); *H04L 51/04* (2013.01); *H04L 51/32* (2013.01)

(58) Field of Classification Search
CPC ....... H04L 51/02; H04L 51/046; H04L 51/14; H04L 67/02; H04L 51/04; H04L 51/32; H04M 3/5191; G06F 40/30; G06F 40/295
See application file for complete search history.

(56) References Cited

U.S. PATENT DOCUMENTS

| | | | |
|---|---|---|---|
| 6,327,363 B1 | 12/2001 | Henderson et al. |
| 6,523,061 B1 | 2/2003 | Halverson et al. |
| 6,546,087 B2 | 4/2003 | Shaffer et al. |
| 6,771,766 B1 | 8/2004 | Shafiee et al. |

(Continued)

*Primary Examiner* — Oleg Survillo
(74) *Attorney, Agent, or Firm* — Schwegman Lundberg & Woessner, P.A.

(57) ABSTRACT

Disclosed are methods, systems, and machine-readable mediums which provide for customer chatbots that detect a customer handoff condition and in response, transferring the customer to a communication session with a live agent. The handoff condition may comprise an inability to understand the customer, an inability to answer the customer's question, expressions of frustration or anger on the part of the customer, a customer's express request to be transferred, or the like. The live agent may receive a complete history of the conversation with the chatbot so that the customer does not have to repeat him or herself to the live agent. The chatbot chat session may be linked to a social networking account of the customer and may take place in association with a social networking profile page of the company.

20 Claims, 8 Drawing Sheets

(56) References Cited

U.S. PATENT DOCUMENTS

| | | |
|---|---|---|
| 6,856,679 B2 | 2/2005 | Pennington, Jr. et al. |
| 6,868,154 B1 | 3/2005 | Stuart et al. |
| 6,907,571 B2 | 6/2005 | Slotznick |
| 7,085,368 B2 | 8/2006 | Hollatz |
| 7,106,850 B2 | 9/2006 | Campbell et al. |
| 7,206,400 B2 | 4/2007 | Dezonno et al. |
| 7,215,757 B2 | 5/2007 | Pennington, Jr. et al. |
| 7,231,033 B2 | 6/2007 | Stuart et al. |
| 7,243,078 B1 | 7/2007 | Lewis-hawkins |
| 7,349,534 B2 | 3/2008 | Joseph et al. |
| 7,386,115 B2 | 6/2008 | Peters |
| 7,519,661 B2 | 4/2009 | Slotznick |
| 7,523,082 B2 | 4/2009 | Mohan |
| 7,623,632 B2 | 11/2009 | Bushey et al. |
| 7,668,756 B2 | 2/2010 | Lewis-hawkins |
| 7,787,612 B2 | 8/2010 | Sussman et al. |
| 7,983,411 B2 | 7/2011 | Huet et al. |
| 8,010,365 B1 | 8/2011 | Collins et al. |
| 8,019,646 B2 | 9/2011 | Lewis-hawkins |
| 8,073,130 B2 | 12/2011 | Dezonno |
| 8,135,126 B2 | 3/2012 | Shafiee et al. |
| 8,180,025 B2 | 5/2012 | Pieraccini et al. |
| 8,275,117 B2 | 9/2012 | Huet et al. |
| 8,279,779 B2 | 10/2012 | Singh et al. |
| 8,326,928 B2 | 12/2012 | Slotznick |
| 8,379,830 B1 | 2/2013 | Naik et al. |
| 8,463,606 B2 | 6/2013 | Scott et al. |
| 8,473,624 B2 | 6/2013 | Mart et al. |
| 8,509,418 B1 | 8/2013 | Chadha |
| 8,533,000 B1 | 9/2013 | Pletz et al. |
| 8,549,074 B1 | 10/2013 | Slotznick |
| 8,737,599 B2 | 5/2014 | Kannan et al. |
| 8,761,377 B2 | 6/2014 | Famous |
| 8,767,948 B1 | 7/2014 | Riahi et al. |
| 8,817,968 B1 | 8/2014 | Boutcher et al. |
| 8,837,687 B2 | 9/2014 | Odinak et al. |
| 8,837,706 B2 | 9/2014 | Odinak et al. |
| 8,842,811 B2 | 9/2014 | Odinak et al. |
| 8,923,502 B2 | 12/2014 | Sharp |
| 8,943,394 B2 | 1/2015 | Weng et al. |
| 8,953,772 B2 | 2/2015 | Wilson |
| 9,008,283 B2 | 4/2015 | Riahi et al. |
| 9,008,288 B2 | 4/2015 | Hollander et al. |
| 9,020,129 B2 | 4/2015 | Busayapongchai |
| 9,036,805 B2 | 5/2015 | Fan et al. |
| 9,083,561 B2 | 7/2015 | Griesmer et al. |
| 9,083,801 B2 | 7/2015 | Conway et al. |
| 9,112,971 B2 | 8/2015 | Munns et al. |
| 9,124,697 B2 | 9/2015 | Scott et al. |
| 9,143,470 B2 | 9/2015 | Blecon et al. |
| 9,148,512 B1 | 9/2015 | Kumar et al. |
| 9,154,626 B2 | 10/2015 | Uba et al. |
| 9,159,054 B2 | 10/2015 | Odinak et al. |
| 9,185,222 B1 | 11/2015 | Govindarajan et al. |
| 9,191,510 B2 | 11/2015 | Conway et al. |
| 9,224,147 B2 | 12/2015 | Franco |
| 9,232,057 B1 | 1/2016 | Witt-ehsani et al. |
| 9,247,061 B2 | 1/2016 | Erhart et al. |
| 9,336,526 B2 | 5/2016 | Tuchman et al. |
| 9,356,897 B1 | 5/2016 | Cantu, II |
| 9,386,152 B2 | 7/2016 | Riahi et al. |
| 9,407,768 B2 | 8/2016 | Conway et al. |
| 9,509,845 B2 | 11/2016 | Odinak et al. |
| 9,549,065 B1 | 1/2017 | Naik et al. |
| 9,559,993 B2 | 1/2017 | Palakovich et al. |
| 9,565,309 B2 | 2/2017 | Munns et al. |
| 9,571,646 B2 | 2/2017 | Kumar et al. |
| 9,571,649 B2 | 2/2017 | Sharpe et al. |
| 9,584,990 B1 | 2/2017 | Boutcher et al. |
| 9,621,728 B2 | 4/2017 | Mccormack et al. |
| 9,635,176 B2 | 4/2017 | Griesmer et al. |
| 9,648,167 B2 | 5/2017 | Riahi et al. |
| 9,652,793 B2 | 5/2017 | Sri et al. |
| 9,667,788 B2 | 5/2017 | Conway et al. |
| 9,712,465 B2 | 7/2017 | Blecon et al. |
| 9,715,496 B1 | 7/2017 | Sapoznik et al. |
| 9,805,371 B1 | 10/2017 | Sapoznik et al. |
| 9,807,037 B1 | 10/2017 | Sapoznik et al. |
| 9,866,693 B2 | 1/2018 | Tamblyn et al. |
| 9,894,207 B2 | 2/2018 | Sri et al. |
| 9,912,810 B2 | 3/2018 | Segre et al. |
| 9,942,400 B2 | 4/2018 | Conway et al. |
| 9,973,457 B2 | 5/2018 | Cauchois et al. |
| 9,992,336 B2 | 6/2018 | Scott et al. |
| 10,003,692 B2 | 6/2018 | Skiba et al. |
| 10,027,804 B2 | 7/2018 | Odinak et al. |
| 10,038,784 B2 | 7/2018 | Odinak et al. |
| 10,038,787 B2 | 7/2018 | Tamblyn et al. |
| 10,044,864 B2 | 8/2018 | Odinak et al. |
| 10,051,123 B2 | 8/2018 | Griesmer et al. |
| 10,079,937 B2 | 9/2018 | Nowak et al. |
| 2002/0087385 A1 | 7/2002 | Vincent |
| 2003/0179876 A1 | 9/2003 | Fox et al. |
| 2007/0206757 A1 | 9/2007 | Pennington et al. |
| 2008/0301444 A1* | 12/2008 | Kim ............... H04L 63/08 713/169 |
| 2008/0307040 A1* | 12/2008 | So ............... G06F 40/174 709/203 |
| 2009/0245500 A1 | 10/2009 | Wampler |
| 2013/0346886 A1* | 12/2013 | Cauchois ............... H04L 51/046 715/758 |
| 2014/0341369 A1 | 11/2014 | Chang et al. |
| 2015/0081571 A1 | 3/2015 | Chauhan et al. |
| 2015/0103995 A1 | 4/2015 | Mccormack et al. |
| 2015/0181039 A1 | 6/2015 | Erhart et al. |
| 2015/0189085 A1 | 7/2015 | Riahi et al. |
| 2015/0281436 A1 | 10/2015 | Kumar et al. |
| 2015/0304492 A1 | 10/2015 | Eyeson |
| 2015/0334240 A1 | 11/2015 | Perlmutter |
| 2015/0358465 A1 | 12/2015 | Munns et al. |
| 2016/0036973 A1 | 2/2016 | Harasimiuk et al. |
| 2016/0179323 A1 | 6/2016 | Kashi et al. |
| 2016/0295018 A1 | 10/2016 | Loftus et al. |
| 2016/0308799 A1 | 10/2016 | Schubert et al. |
| 2017/0324868 A1* | 11/2017 | Tamblyn ............... H04M 3/5191 |
| 2017/0339274 A1 | 11/2017 | Odinak et al. |
| 2018/0012231 A1 | 1/2018 | Sapoznik et al. |
| 2018/0013699 A1 | 1/2018 | Sapoznik et al. |
| 2018/0048865 A1* | 2/2018 | Taylor ............... G06F 3/0488 |
| 2018/0054523 A1 | 2/2018 | Zhang et al. |
| 2018/0167508 A1 | 6/2018 | Sri et al. |
| 2018/0227421 A1 | 8/2018 | Conway et al. |
| 2018/0253734 A1 | 9/2018 | Henry |

* cited by examiner

AUTOMATED CHATBOT TRANSFER TO LIVE AGENT

PRIORITY CLAIM

This patent application claims the benefit of priority to U.S. Provisional Patent Application Ser. No. 62/475,681, entitled "AUTOMATED CHATBOT TRANSFER TO LIVE AGENT," filed on Mar. 23, 2017, which is hereby incorporated by reference herein in its entirety.

BACKGROUND

Conversational software which emulates a customer service agent, hereinafter, "chatbots," are often able to assist customers. These chatbots determine a semantic meaning of the customer's query and attempt to provide an answer from a database of answers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
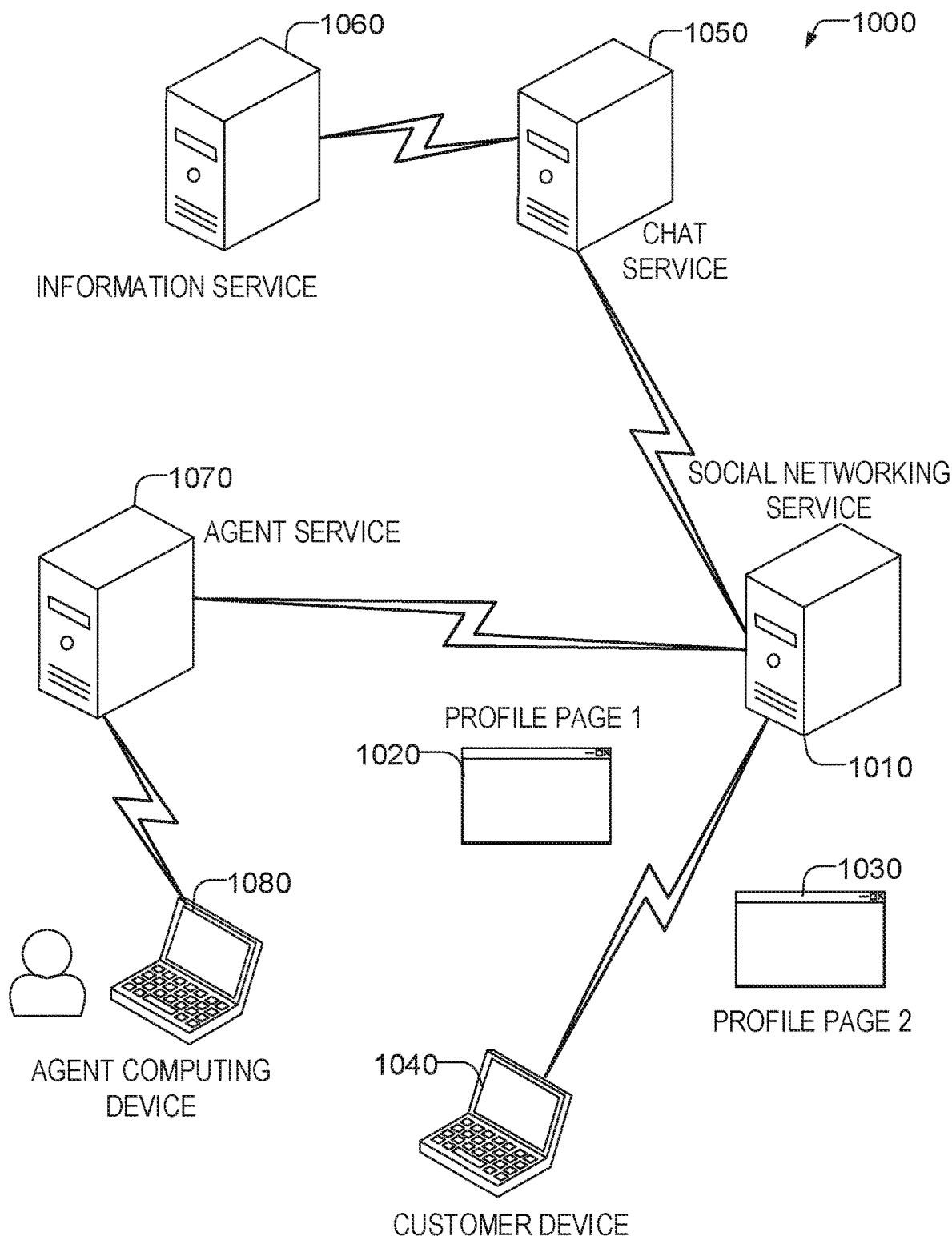
FIG. 1 is a schematic of an example chatbot environment according to some examples of the present disclosure.

With the rise of the internet and other network-based communication mediums, companies are utilizing these mediums to expand the ways they can reach and support their customers. For example, network based computing services such as social networking services are embraced by companies as a way of communicating with customers. Persons may communicate using the social networking service by posting a message on a profile page of a user, participating in chats hosted by a social networking service, direct messaging, or the like.

While communicating with customers through these new mediums is convenient for the customer, it increases costs of the company as it adds another support channel that needs to be staffed. In some examples, in order to reduce these costs, the company may employ chatbot software on these channels. For example, a customer may come to a social networking profile page of the organization and start a chat session. The message the user enters into the profile page chat window may be sent to a network-based chat service that may determine a semantic meaning of the user's message, select an appropriate response, and send the response back to the social networking service for display in the chat session.

In some cases the chatbots may not be able to help the user. For example, the user may have a question that the chatbot is not programmed to answer, the user may be angry and may not want to chat with the chatbot, or the like. In these instances, presently, the user may have to disconnect with the chatbot and find an alternative method of contacting the company. This is not seamless to the customer and introduces obstacles to resolving the customer's problem. Some customers may give up and take their business to a competitor rather than find another channel.

Disclosed in some examples are methods, systems, and machine-readable mediums which provide for customer support chatbots that detect a customer handoff condition and in response, transfer the customer to a communication session with a live agent. The handoff condition may comprise an inability to understand the customer, an inability to answer the customer's question, expressions of frustration or anger on the part of the customer, a customer's express request to be transferred, or the like. The live agent may receive a partial or complete history of the conversation with the chatbot so that the customer does not have to repeat him or herself to the live agent. In some examples, the chatbot chat session may be linked to a social networking account of the customer and may take place in association with a social networking profile page of the company.

On some social networking services, such as FACE-BOOK®, these social networking services are structured so as to allow only a single application the ability to post messages in a chat on the social networking service (in some examples, multiple applications may read the chats). For example, the social networking service provides web hooks that are HTTP requests (e.g., POST calls) that happen upon the occurrence of an event, such as a message entered by a user. The social networking service sends an HTTP request (such as a POST message) to the web hook address upon occurrence of an event (e.g., the user enters a message). The chatbot application listens for these HTTP requests at the given address and then responds by utilizing another HTTP call (e.g., a POST call) which is then posted to the chat by the social networking service.

As noted, it is not possible to have messages delivered to both a chatbot service and a live agent. Thus, the chatbot may be "attached" to the chat page, and it is not possible for the live agent to also send messages to the user via the chat. In some examples, as disclosed herein, to solve this problem, the chatbot, upon detection that the customer is unsatisfied with the chatbot, may provide a link to a second chat page provided by the social networking service which may be attached to an application which allows for a customer service agent to directly communicate with the customer.

In other examples, another solution to this problem is to route the web hooks to a chat routing application. This chat routing application may route the chat messages to either the chatbot or to a live agent. In some examples, the chat router may default to the chatbot. The chatbot may signal the router that the conversation should be transferred to a live agent. In these examples, once the signal is received, the router then routes subsequent communications to the live agent. The live agent may later transfer control back to the chatbot. In some examples, messages may be individually routed to either the chatbot or the live agent. For example, the message may be first routed to the chatbot. The chatbot may have a confidence level associated with an automatically generated answer with respect to the chatbots ability to accurately answer the question. If the confidence level of the answer is below a predetermined threshold, one or both of the user's communication and the chatbot's proposed answer may be sent (e.g., directly, or forwarded through the chat routing application) by the chat router to the live agent.

Turning now to FIG. 1 a schematic of an example chatbot environment 1000 is shown according to some examples of the present disclosure. Social networking service 1010 may be a network-accessible social networking service which provides one or more profile pages, such as profile page 1020 and profile page 1030. These profile pages may be associated with a particular organization. A customer may access these profile pages over a network using a customer computing device 1040. The profile page 1020 may include a chat feature that allows the customer to enter a message for the organization into a Graphical User Interface (GUI) element positioned on the profile page 1020. In some examples, the social networking service 1010 receives this message and calls the appropriate callback (e.g., a web hook), which may be pointed at the chat service 1050. Chat service 1050 may utilize various natural language processing (NLP) algorithms to determine an intent of the message. Based upon the intent, the chat service 1050 may be programmed to select an appropriate response. In some examples, the chat service 1050 may contact an information service 1060. For example, if the customer is asking about an account balance, then the chat service 1050 may contact information service (e.g., a bank account server) for the balance information. Chat service 1050 then sends a reply to the social networking service (e.g., through an HTTP POST call). This reply may be delivered back to customer computing device 1040 through the GUI element of the profile page 1020.

In some examples, should the chat service 1050 detect a customer hand off event, the chat service 1050 may send a link to a second page (e.g., profile page 1030) to the social networking service 1010 for posting in the chat GUI element displayed in profile page 1020. The user of customer computing device 1040 may follow this link (e.g., by clicking, tapping, or otherwise activating it) which may redirect a web browser or other application executing on the customer computing device 1040 to the web address of profile page 1030. The user may then enter a message through a chat GUI element on profile page 1030 which may be routed through web hooks by social networking service 1010 to agent service 1070. Agent service 1070 may be a network-based service that monitors one or more social networking profile pages for activity.

Once activity is detected, the agent service 1070 may provide tools for agent computing devices 1080 to communicate with the customers. For example, if the customer computing device 1040 sends a message to the organization through profile page 1030, the agent service may receive the web hook callback. This callback may then be routed to an appropriate agent computing device 1080. The agent may utilize agent computing device 1080 to reply (through the agent service 1070). For example, the agent computing device 1080 may send a reply to agent service 1070, which may forward the reply to the social networking service 1010 for posting to the profile page 1030.

Figure 2:
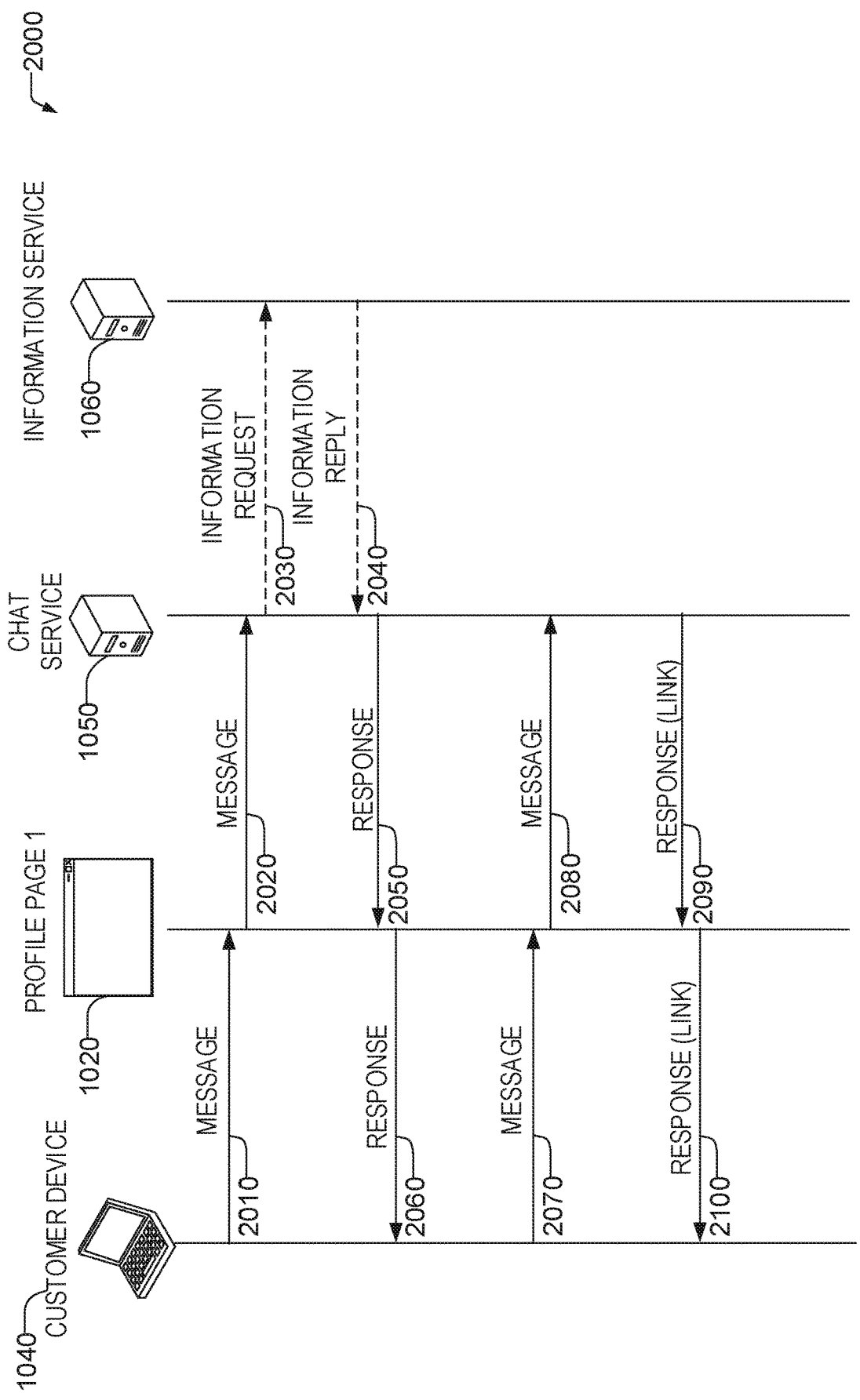
FIG. 2 is a message sequence diagram of a handoff according to some examples of the present disclosure.

Turning now to FIG. 2, a message sequence diagram 2000 is shown according to some examples of the present disclosure. User types message 2010 into the GUI element of the profile page 1020. This is sent to the social networking service for display in the GUI. This message is then forwarded by the social networking service 2020 to the chat service 1050 (e.g., by way of a web hook). In some examples, an information request may be submitted 2030 to an information service 1060 if the chat service 1050 needs additional information to formulate a reply. The information may be returned in an information reply message 2040. Chat service 1050 may formulate a reply message using algorithms such as natural language processing and/or machine learning. These replies are automatically generated by the algorithms without the assistance of a human operator, aside from potential assistance in programming the algorithms or training the machine learning algorithms.

Response 2050 is sent back to the social networking service for display in the profile page 1020. This is then sent to the customer device 1040 with response message 2060. Second message 2070 from the user entered on their customer computing device 1040 in a GUI element of the profile page 1020 (e.g., the same GUI element used to enter message 2010) may be sent to chat service 1050 with message 2080. Chat service 1050 may send a response 2090 with a link to a second profile page. For example, the chat service 1050 may detect a hand-off condition and in response send the link. The response 2100 may be received by the customer computing device 1040 through the profile page 1020.

Figure 3:
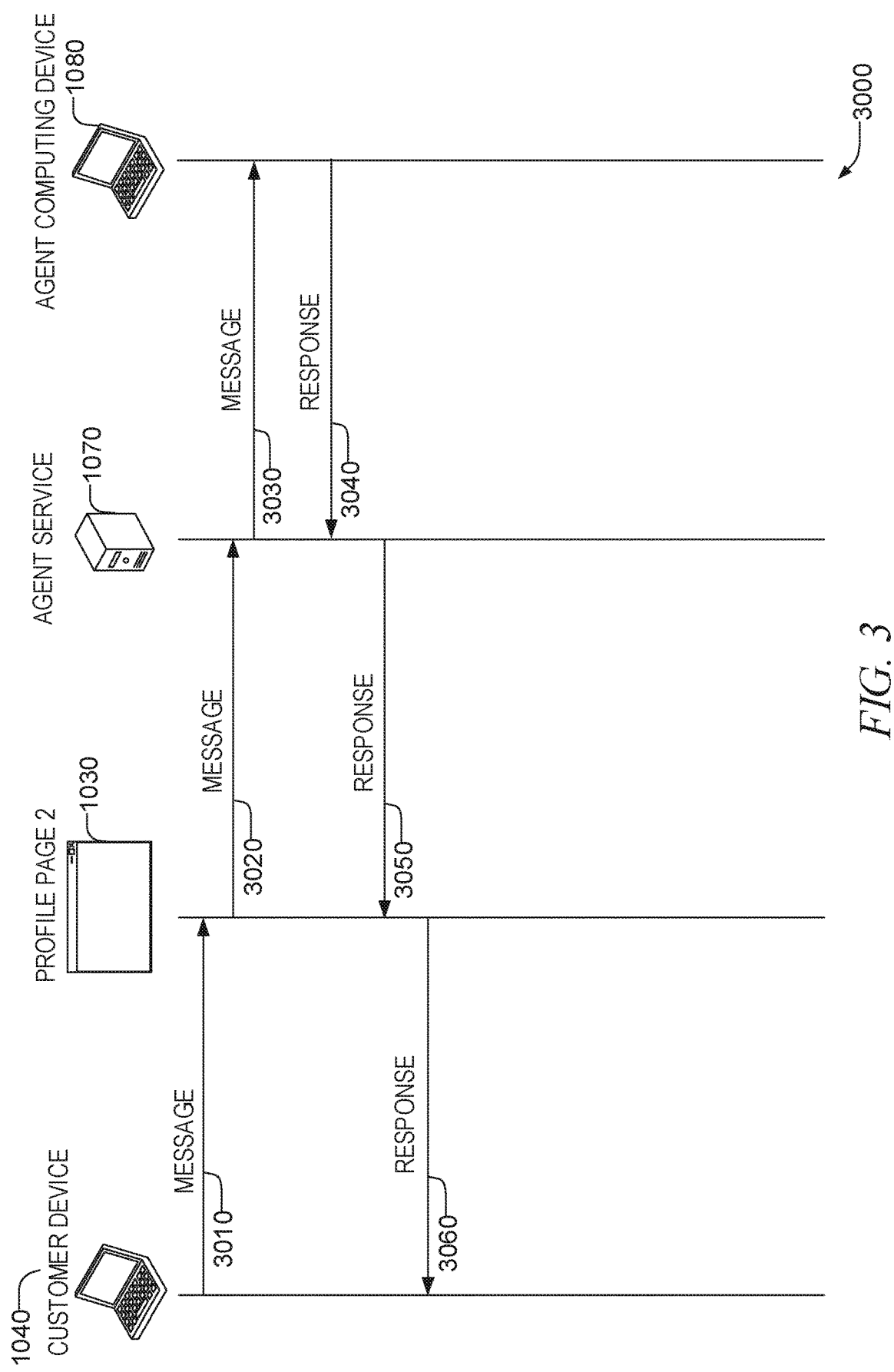
FIG. 3 is a message sequence diagram of messaging after a handoff according to some examples of the present disclosure.

Turning now to FIG. 3, a message sequence diagram 3000 is shown according to some examples of the present disclosure. The diagram 3000 shows an example messaging sequence that occurs after the user clicks on a link sent by the chat service 1050 displayed in profile page 1020 from FIG. 2. In response to selecting the link, the customer computing device 1040 then retrieves and displays the profile page 1030. Profile page 1030 may have GUI elements that may allow the user to enter messages for the organization. For example, the user may enter message 3010 which is received by the social networking service and used to update the profile page 1030 (e.g., to display the message). This message is then passed by the social networking service using a predetermined web hook 3020 to agent service 1070. Agent service 1070 passes the message 3030 to the agent's computing device 1080. For example, the agent service 1070 may route the message to one of a plurality of agent computing devices. The agent may formulate a response and enter it into the agent computing device 1080. Response 3040 may be passed to agent service 1070 (or directly to the social networking service) which may post the response 3050 to the profile page 1030 (e.g., by sending a POST or other HTTP command to the social networking service). The response is then obtained by the customer computing device 1040 through profile page 1030 using response 3060 and is viewable by the customer.

In some examples, the customer's chat history with the chatbot may be available to the agent. For example, the social networking service may allow multiple web hooks for monitoring (but not posting to) the profile page 1020. In these examples, the agent service 1070 may monitor these pages and when there is a handoff event, it may route the chat history to the agent computing device 1080.

Figure 4:
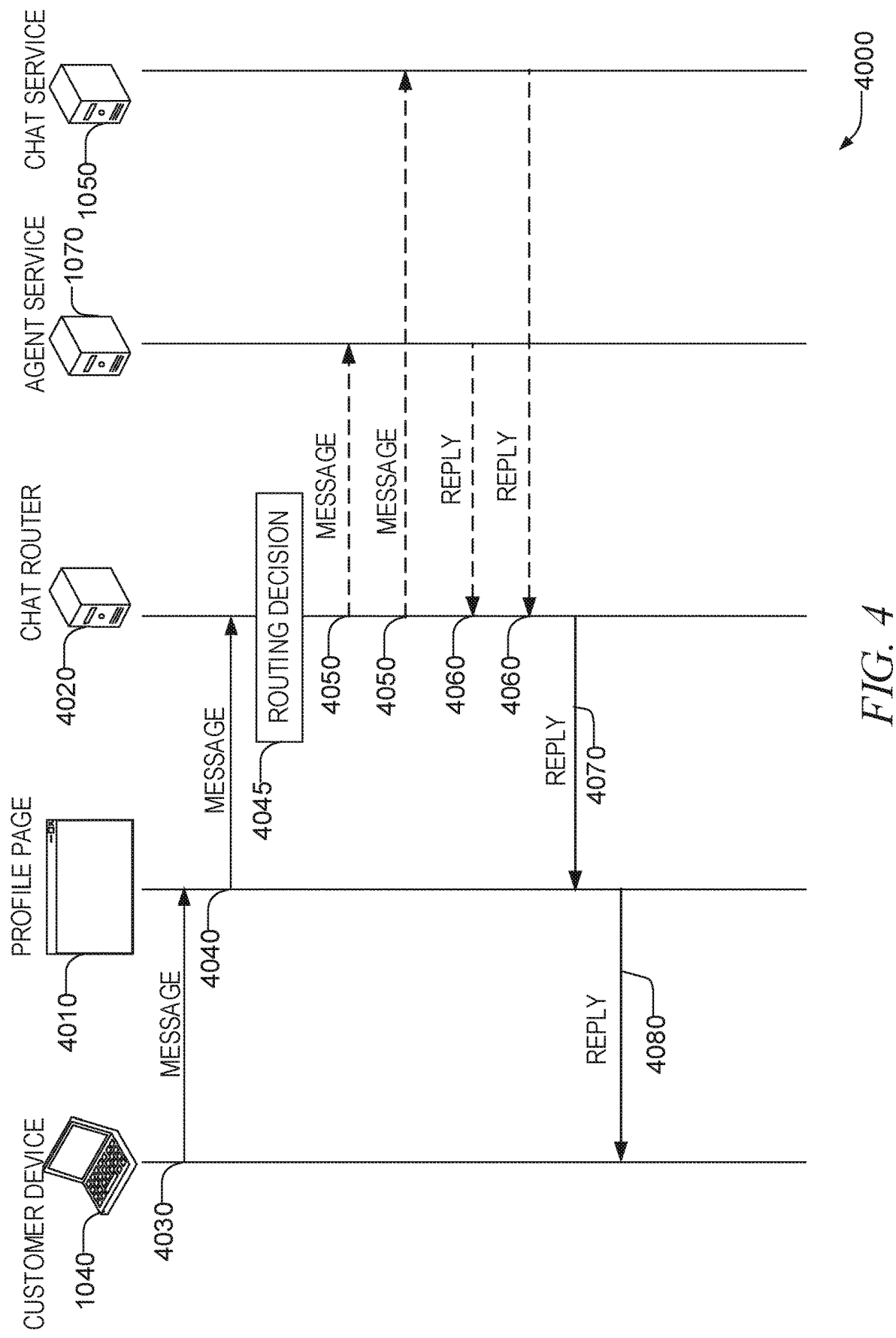
FIG. 4 is a message sequence diagram of a chat router according to some examples of the present disclosure.

Turning now to FIG. 4 a message sequence diagram 4000 is shown according to some examples of the present disclosure. FIG. 4 shows an example where the web hooks are registered to a chat router 4020 which routes the message to either the agent service 1070 or the chat service 1050 (or in some examples, both) and routes the reply back to the profile page 4010. The user's message 4030 that is entered into the customer computing device 1040 may be sent to the social networking service and entered into the profile page 4010 (which may be profile page 1020, 1030, or another profile page). This message may be forwarded through callbacks (e.g., web hooks) 4040 to the chat router 4020. The chat router 4020 may make a routing decision 4045. In some examples, the chat router 4020 may send the message 4050 to one of the agent service 1070 and the chat service 1050 (e.g., through web hooks registered with the chat router 4020). The reply from these services may be received 4060 by the chat router 4020 and passed to the social networking service 4070 for posting to the profile page 4010 which is then received 4080 by the customer computing device 1040.

In some examples, the chat service 1050 may implement a machine learning algorithm. The chat router 4020 or the agent service 1070 may utilize the message 4030 along with the live agent's response to refine the machine-learning model in the chat service 1050. In this way, the chatbot may continuously improve the quality of its responses. In some examples, the chat router 4020 may send the message 4050 to both the agent service 1070 and the chat service 1050. The corresponding responses may then be scored by the chat router based upon a machine learning algorithm implemented by the chat router that is trained using appropriate responses for a training set of questions. The chat router 4020 may then send the response that scored the highest and/or the relevancy or appropriateness rating (e.g., the response from either the agent service 1070 or the chat service 1050). In some examples, the chat router 4020 may send the message 4050 and receive the reply 4060 to the chat service 1050 first. The message 4050 and the reply 4060 may then be both forwarded to the agent service 1070. The chatbot's answer may assist the agent in determining an appropriate answer. The agent may then respond appropriately and either forward the chatbot's answer 4060 as the answer or another answer.

Figure 5:
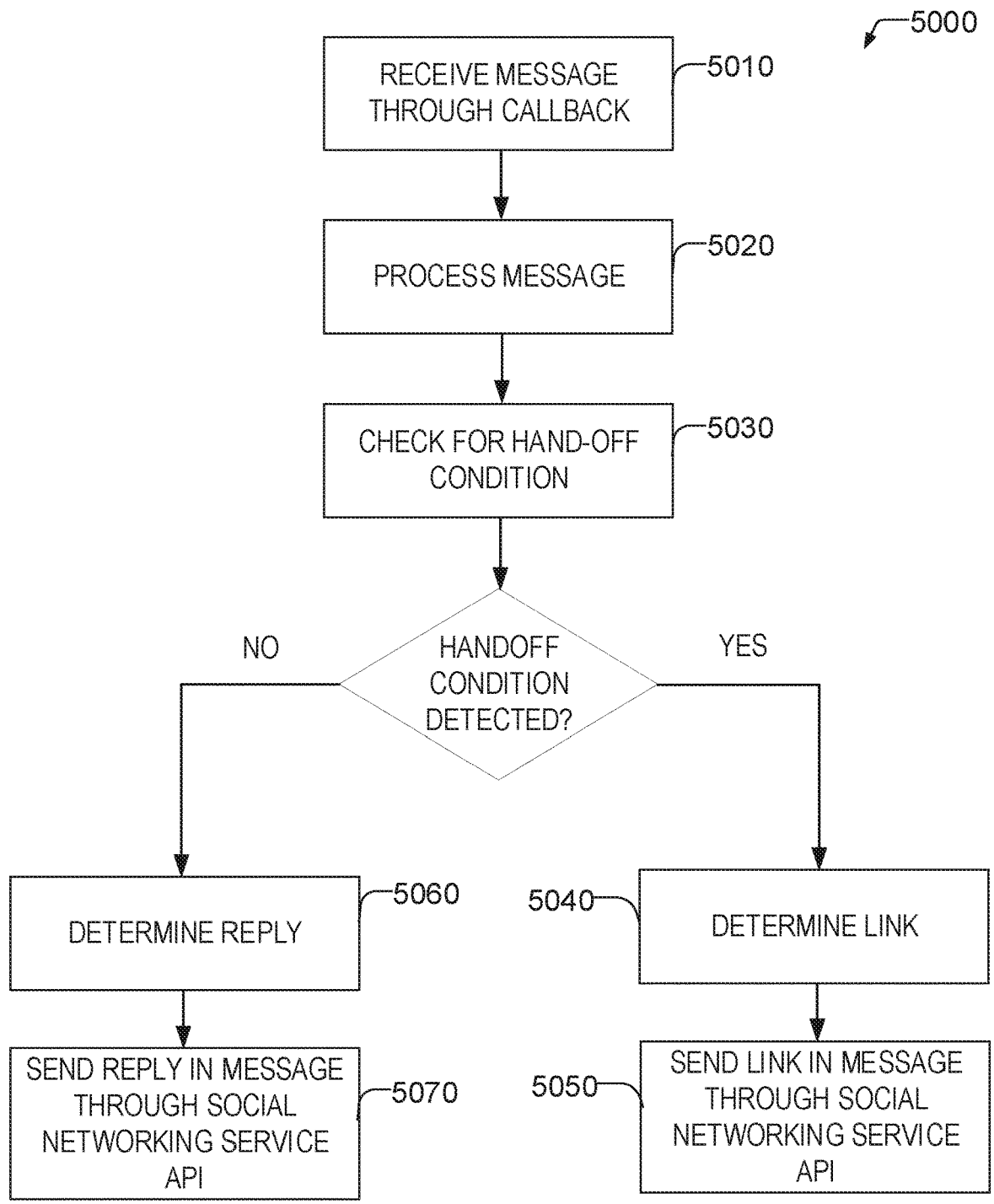
FIG. 5 is a flowchart of an example method of transitioning a customer using a chatbot provided by a chat service from a first page of a social networking service to a second page hosting a chat with a live agent is shown according to some examples of the present disclosure.

Turning now to FIG. 5 an example method 5000 of transitioning a customer using a chatbot provided by a chat service from a first page of a social networking service to a second page hosting a chat with a live agent is shown according to some examples of the present disclosure. Prior to the method of FIG. 5, the chatbot is registered (by the chatbot or by an administrator of the organization) and web hooks or other callbacks are provided to the social networking system. These web hooks would provide a web-address of the chatbot service. The social networking service then sends a callback in the form of an HTTP request to this web address upon occurrence of a chat event, such as a new message. At operation 5010 the chatbot receives a message through this callback mechanism. At operation 5020 the chatbot processes the message. For example, it may parse the message using one or more natural language processing algorithms to determine a meaning (e.g., subject of the message, whether it is a positive or negative tone, and the like) of the message. At operation 5030 based upon one or more indicator data sources the system may determine whether a hand off condition has occurred based upon the parsed message. Indicator data sources may comprise the meaning of the message (as determined from the processing in operation 5020), contents of the message, the chat history of the user, and the like.

The handoff condition may comprise one or more of an inability to understand the customer, an inability to answer the customer's question, expressions of frustration or anger on the part of the customer, a customer's express request to be transferred, or the like. Example methods of detecting handoff conditions include an inability to parse the message in operation 5020, keywords or key phrases in the message (e.g., "I want to speak to a person", "I'm angry"), sentiment of the message (e.g., angry) and the like.

In other examples, a machine learning classifier such as a support vector machine, logistic regression, Bayes point machine, decision forest, boosted decision tree, neural network is used to determine whether or not to handoff the conversation. This machine learning algorithm may be trained with conversations that are labeled (e.g., as do not hand off or hand off). Once the model is trained, new conversations may then be classified to determine whether a handoff condition is present by the machine learned model.

At operation 5040 if a handoff condition is detected, the link to a chat session with an agent may be determined. For example, the link may be a predetermined link that is set by an administrator or hard coded. In other examples, the link may be to one of many chat pages that are associated with an agent service (such as agent service 1070) of the organization. For example, the chat service 1050 may contact agent service 1070 and request a link. Agent service 1070 may provide a link that is selected from a plurality of links based upon wait time for an agent. Once a link is determined, at operation 5050 a message is constructed with the link as part of the message and sent to the social networking service for posting in the GUI element of the chat.

At operation 5060 if a handoff condition is not detected, the chat service determines a reply message. For example, based upon the intent determined in operation 5020, a predetermined reply for the determined intent may be used. In other examples, various machine learning algorithms may be utilized to determine a reply message (e.g., from a predetermined list of responses). In some examples, a request for information from an information service (e.g., information service 1060) may be made as part of determining the reply message. At operation 5070 a message is constructed with the reply as part of the message and sent to the social networking service for posting in the GUI element of the chat.

Figure 6:
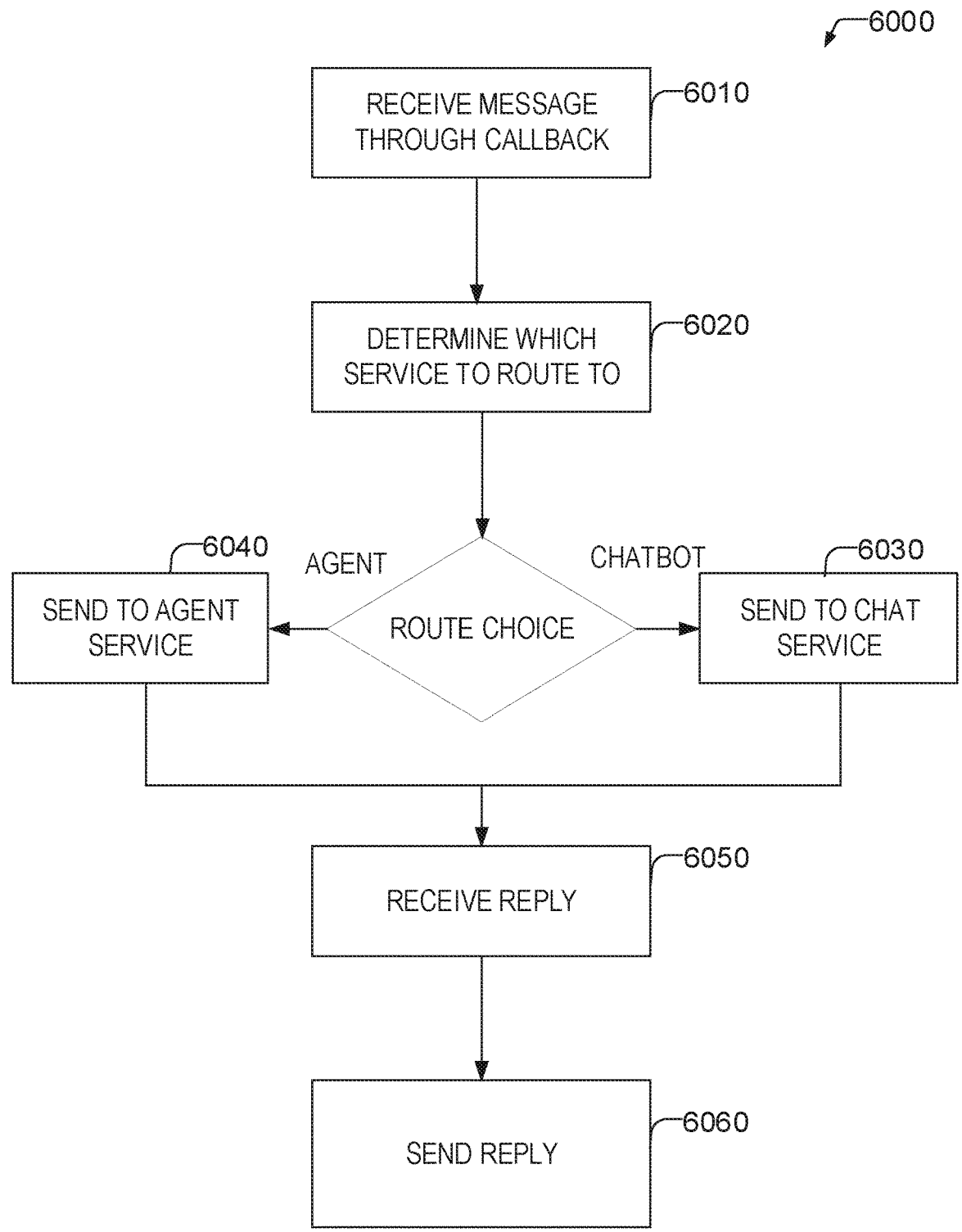
FIG. 6 is a flowchart of an example method of transitioning a chat from a chatbot to a live agent according to some examples of the present disclosure.

Turning now to FIG. 6, an example method 6000 of transitioning a chat from a chatbot to a live agent is shown according to some examples of the present disclosure. Method 6000 may be performed by a chat router such as chat router 4020. At operation 6010 the chat router may receive a chat message from the user that was entered into the GUI element of the social networking page which was forwarded via a web hook that was previously registered by an administrator or the like. At operation 6020 the chat router may determine whether to route the message to the chatbot (executed by the chat service) or a live agent through the agent service. In some examples, the chatbot may make this determination (as described in FIG. 5) and signal the chat router. For example, the route choice may default to the chat service unless the chat service indicates to the chat router that further communications should be sent to the agent service. In these examples, the route may be determined by a flag indicating communications from the user should go to the agent service.

At operation 6030 if the message is to be routed to the chatbot, it is sent to the chat service (for example, by utilizing a web hook of the chat service registered with the chat router). At operation 6040 if the message is to be routed to an agent, it is sent to the agent service (for example, by utilizing a web hook registered with the agent service). At operation 6050 the chat router receives a reply message (from either the agent service or the chat service). At operation 6060 the reply is sent back to the customer. For example, by sending it to the social networking service for display in the chat GUI.

Figure 7:
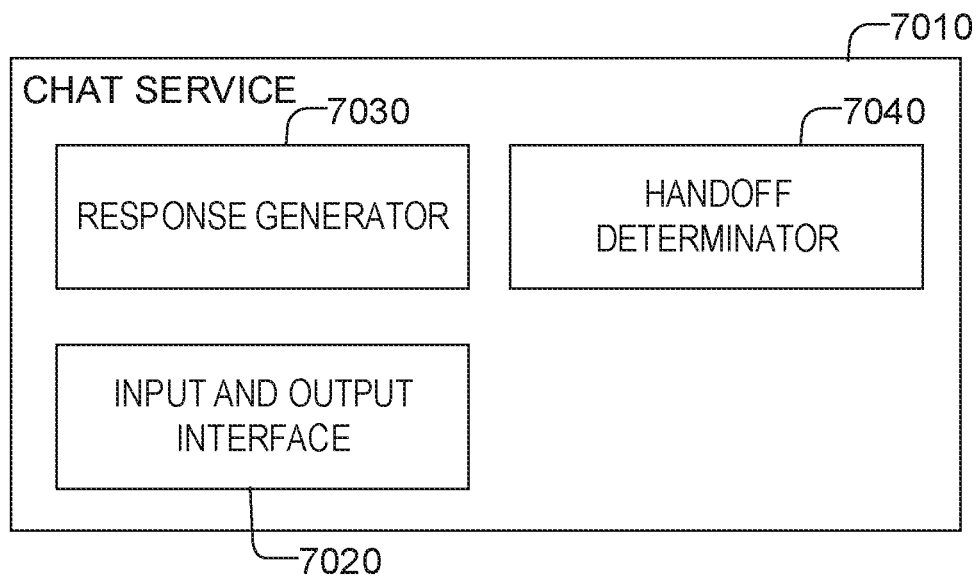
FIG. 7 is a logical schematic of a chat service and a chat router according to some examples of the present disclosure.
Figure 7:
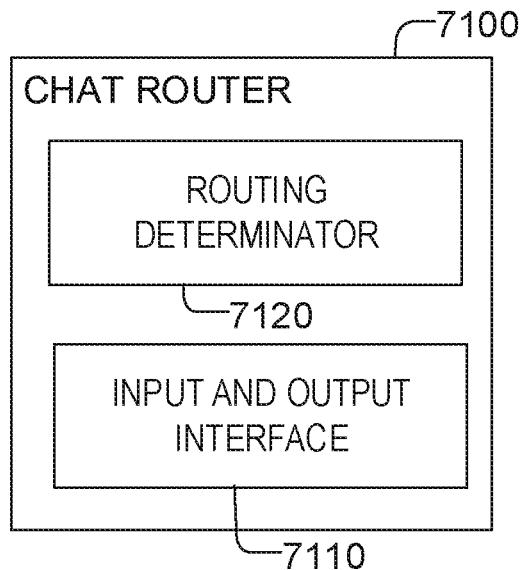

Turning now to FIG. 7 logically schematics of a chat service 7010 and a chat router 7100 are shown according to some examples of the present disclosure. The logical components shown in FIG. 7 are exemplary only and different organizations may be utilized such that some functionality of one component may be implemented in one or more different components.

Chat service 7010 may be an example of chat service 1050, and may implement the method of FIG. 5. Input and Output interface 7020 receives callbacks (e.g., in the form of HTTP web hooks) and passes it to response generator 7030. Response generator utilizes machine learning models and databases to attempt to determine the intent of the message from the customer. Past messaging history may also be utilized (e.g., if the conversation was about topic X, this may assist the system in determining an appropriate topic). Based upon the intent analysis the response generator 7030 may determine an appropriate response. Handoff determinator 7040 may receive information on the message from the response generator 7030, including whether or not the response generator 7030 was able to understand the message, whether the response generator 7030 has a degree of confidence (e.g., over a predetermined threshold degree of confidence) in the response, whether there were keywords or key phrases detected ("e.g., I want to talk to an agent!"), whether the customer is experiencing frustration, or the like. Based upon these indicators and in some examples, the chat history of the user, the handoff determinator determines whether or not the chat should be handed off to an agent. If so, the handoff determinator sends a link to a page on the social networking service that is monitored by the agent service back to the user in the chat through the social networking service (e.g., using an HTTP POST). If the handoff determinator determines that a handoff condition is not met, then the response generator 7030 may send the message back to the social networking service (e.g., using a HTTP POST).

Chat router 7100 may be an example of chat router 4020 and may implement FIG. 6. Input and output interface 7110 may receive a message through a web hook or other callback from a social networking service. The routing determinator 7120 determines whether to route it to a chat service or an agent service. It may route the message to a chatbot on a chat service by default, unless the handoff determinator 7040 communicates to the chat router 7100 through the input and output interface 7110 that the conversation should be routed through to the agent service. The chat router 7100 may set a flag for this conversation in response to receiving this indication by the chat service 7010, once this flag is set, subsequent messages may be routed to the agent service. Thus, the chat router 7100 may determine the routing based upon a flag. In some examples, the message may be routed to both the agent service and the chat service. Either the chat service or the agent service may set the flag to allow for redirection of the chat to the agent service. Thus, for example, an agent may be passively monitoring the chatbot session and decide to intervene. Likewise, the agent service may reset the flag to hand the conversation back to the chatbot.

Examples herein may have been described with reference to a social networking service. In some examples, the concepts disclosed herein are applicable to any chatbot session and are not limited to social networking services, but are broadly applicable to other types of network-based communications in general. A social networking service is a type of network-based service provided by one or more computer systems accessible over a network that allows members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

Figure 8:
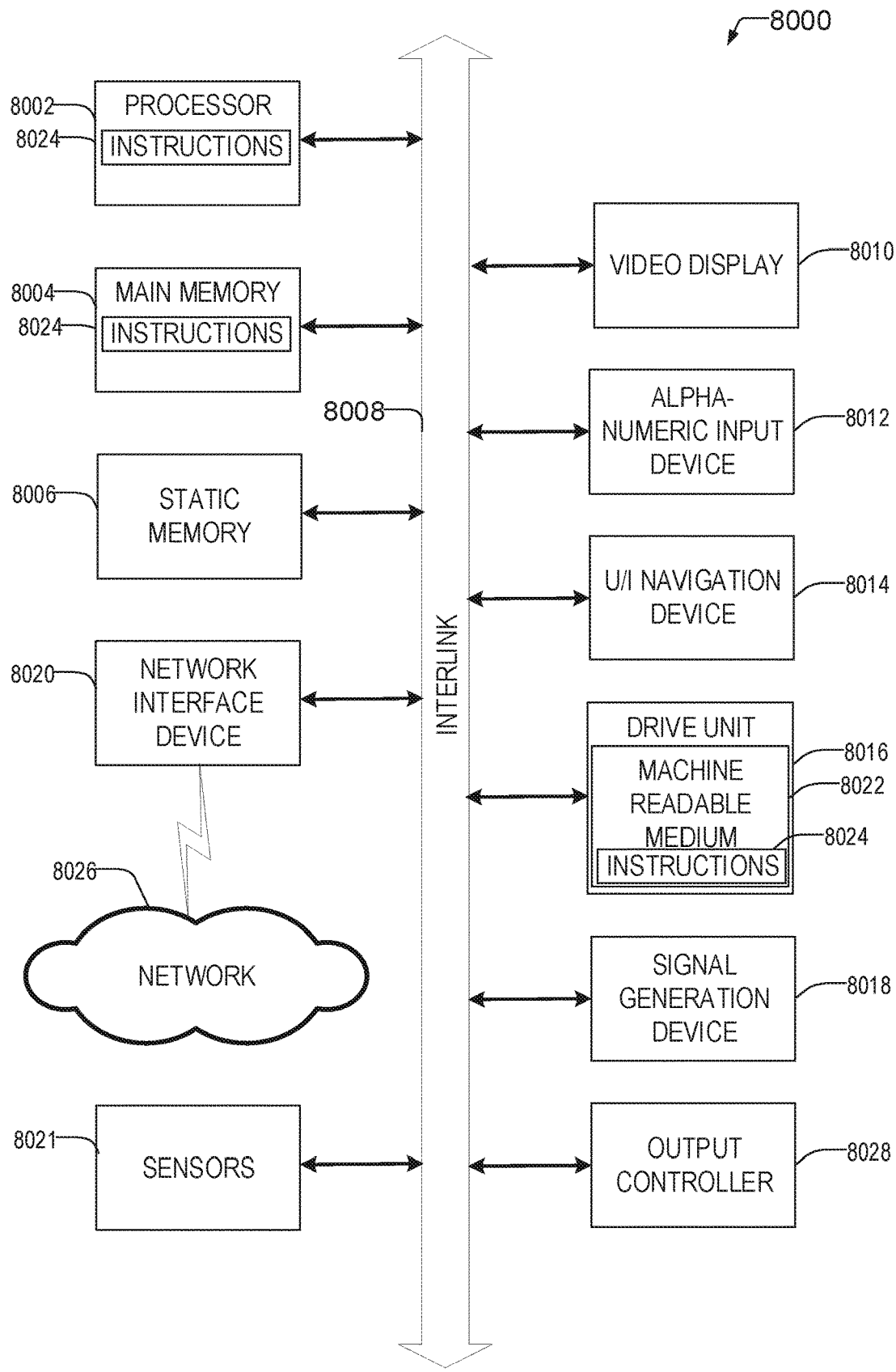
FIG. 8 is a block diagram illustrating an example of a machine upon which one or more embodiments may be implemented.

FIG. 8 illustrates a block diagram of an example machine 8000 upon which any one or more of the techniques (e.g., methodologies) discussed herein may perform. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. The machine 8000 may implement the chat service (e.g., chat service 7010, 1050), the chat router (e.g., chat router 4020, 7100), agent service (e.g., agent service 1070), social networking service (e.g., social networking service 1010), customer computing device 1040, agent computing device 1080, information service 1060, and the like. The machine 8000 may implement FIGS. 2-6. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. For example, the components of FIG. 7 may be referred to as modules. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

OTHER NOTES AND EXAMPLES

Example 1 is a method for redirecting a digital communication, the method comprising: receiving, from a social networking service, a user message entered into a first chat page of the social networking service, the message posted by a user, and the message received through a callback web address provided to the social networking service; processing the user message using natural language processing; determining, based upon the processed user message, that a chat on the chat page should be handed off from an automated chatbot to a human agent, the handoff condition comprising: presence of a keyphrase; presence of a key word; an inability to determine a meaning of the message; and an inability to provide an answer to the message that is above a predetermined level of confidence in answering the message; determining a link to a second social networking service chat page, the second social networking service chat page registered to an agent service that routes communications with the second social networking service chat page to the human agent; and sending the link to the second social networking service chat page to the social networking service for posting to the first chat page.

In Example 2, the subject matter of Example 1 includes, receiving, from the social networking service, an earlier message before the message, the earlier message entered into the chat page of the social networking service, the earlier message posted by the user, the earlier message received through the callback web address provided to the social networking service; processing the earlier message; determining from the earlier processed message that the hand-off condition is not indicated; determining a response to the earlier process message, the response generated without human intervention; and sending the response to the social networking service for posting to the first chat page.

In Example 3, the subject matter of Example 2 includes, receiving content from an information service over a network; and inserting the content into the response.

In Example 4, the subject matter of Example 3 includes, wherein the information service is an account information service and the content is information on an account of the user at the information service.

In Example 5, the subject matter of Examples 1-4 includes, wherein determining from the processed message that the handoff condition is indicated in the message comprises: inputting the processed message to a machine learning algorithm; and receiving an output of the machine learning algorithm indicating that the handoff condition is indicated.

In Example 6, the subject matter of Example 5 includes, training the machine learning algorithm with past chat logs annotated indicating a handoff condition.

In Example 7, the subject matter of Examples 1-6 includes, wherein determining the link to the second social networking service chat page comprises receiving the link from the agent service over a network.

Example 8 is a non-transitory machine-readable medium comprising instructions for causing a redirection of a digital communication, the instructions, when executed by a machine, causing the machine to perform operations comprising: receiving, from a social networking service, a user message entered into a first chat page of the social networking service, the message posted by a user, and the message received through a callback web address provided to the social networking service; processing the user message using natural language processing; determining, based upon the processed user message, that a chat on the chat page should be handed off from an automated chatbot to a human agent, the handoff condition comprising: presence of a keyphrase; presence of a key word; an inability to determine a meaning of the message; and an inability to provide an answer to the message that is above a predetermined level of confidence in answering the message; determining a link to a second social networking service chat page, the second social networking service chat page registered to an agent service that routes communications with the second social networking service chat page to the human agent; and sending the link to the second social networking service chat page to the social networking service for posting to the first chat page.

In Example 9, the subject matter of Example 8 includes, wherein the operations further comprise: receiving, from the social networking service, an earlier message before the message, the earlier message entered into the chat page of the social networking service, the earlier message posted by the user, the earlier message received through the callback web address provided to the social networking service; processing the earlier message; determining from the earlier processed message that the hand-off condition is not indicated; determining a response to the earlier process message, the response generated without human intervention; and sending the response to the social networking service for posting to the first chat page.

In Example 10, the subject matter of Example 9 includes, wherein the operations further comprise: receiving content from an information service over a network; and inserting the content into the response.

In Example 11, the subject matter of Example 10 includes, wherein the information service is an account information service and the content is information on an account of the user at the information service.

In Example 12, the subject matter of Examples 8-11 includes, wherein the operations of determining from the processed message that the handoff condition is indicated in the message comprises: inputting the processed message to a machine learning algorithm; and receiving an output of the machine learning algorithm indicating that the handoff condition is indicated.

In Example 13, the subject matter of Example 12 includes, wherein the operations further comprise: training the machine learning algorithm with past chat logs annotated indicating a handoff condition.

In Example 14, the subject matter of Examples 8-13 includes, wherein the operations of determining the link to the second social networking service chat page comprises receiving the link from the agent service over a network.

Example 15 is a computing device comprising: a processor; a memory, the memory storing instructions, which when executed by the processor, cause the processor to perform the operations comprising: receiving, from a social networking service, a user message entered into a first chat page of the social networking service, the message posted by a user, and the message received through a callback web address provided to the social networking service; processing the user message using natural language processing; determining, based upon the processed user message, that a chat on the chat page should be handed off from an automated chatbot to a human agent, the handoff condition comprising: presence of a keyphrase; presence of a key word; an inability to determine a meaning of the message; and an inability to provide an answer to the message that is above a predetermined level of confidence in answering the message; determining a link to a second social networking service chat page, the second social networking service chat page registered to an agent service that routes communications with the second social networking service chat page to the human agent; and sending the link to the second social networking service chat page to the social networking service for posting to the first chat page.

In Example 16, the subject matter of Example 15 includes, wherein the operations further comprise: receiving, from the social networking service, an earlier message before the message, the earlier message entered into the chat page of the social networking service, the earlier message posted by the user, the earlier message received through the callback web address provided to the social networking service; processing the earlier message; determining from the earlier processed message that the hand-off condition is not indicated; determining a response to the earlier process message, the response generated without human intervention; and sending the response to the social networking service for posting to the first chat page.

In Example 17, the subject matter of Example 16 includes, wherein the operations further comprise: receiving content from an information service over a network; and inserting the content into the response.

In Example 18, the subject matter of Example 17 includes, wherein the information service is an account information service and the content is information on an account of the user at the information service.

In Example 19, the subject matter of Examples 15-18 includes, wherein the operations of determining from the processed message that the handoff condition is indicated in the message comprises: inputting the processed message to a machine learning algorithm; and receiving an output of the machine learning algorithm indicating that the handoff condition is indicated.

In Example 20, the subject matter of Example 19 includes, wherein the operations further comprise: training the machine learning algorithm with past chat logs annotated indicating a handoff condition.

In Example 21, the subject matter of Examples 15-20 includes, wherein the operations of determining the link to the second social networking service chat page comprises receiving the link from the agent service over a network.

Example 22 is a device for redirecting a digital communication, the device comprising: means for receiving, from a social networking service, a user message entered into a first chat page of the social networking service, the message posted by a user, and the message received through a callback web address provided to the social networking service; means for processing the user message using natural language processing; means for determining, based upon the processed user message, that a chat on the chat page should be handed off from an automated chatbot to a human agent, the handoff condition comprising: presence of a keyphrase; presence of a key word; an inability to determine a meaning of the message; and an inability to provide an answer to the message that is above a predetermined level of confidence in answering the message; means for determining a link to a second social networking service chat page, the second social networking service chat page registered to an agent service that routes communications with the second social networking service chat page to the human agent; and means for sending the link to the second social networking service chat page to the social networking service for posting to the first chat page.

In Example 23, the subject matter of Example 22 includes, means for receiving, from the social networking service, an earlier message before the message, the earlier message entered into the chat page of the social networking service, the earlier message posted by the user, the earlier message received through the callback web address provided to the social networking service; means for processing the earlier message; means for determining from the earlier processed message that the hand-off condition is not indicated; means for determining a response to the earlier process message, the response generated without human intervention; and sending the response to the social networking service for posting to the first chat page.

In Example 24, the subject matter of Example 23 includes, means for receiving content from an information service over a network; and means for inserting the content into the response.

In Example 25, the subject matter of Example 24 includes, wherein the information service is an account information service and the content is information on an account of the user at the information service.

In Example 26, the subject matter of Examples 22-25 includes, wherein determining from the processed message that the handoff condition is indicated in the message comprises: means for inputting the processed message to a machine learning algorithm; and means for receiving an output of the machine learning algorithm indicating that the handoff condition is indicated.

In Example 27, the subject matter of Example 26 includes, means for training the machine learning algorithm with past chat logs annotated indicating a handoff condition.

In Example 28, the subject matter of Examples 22-27 includes, wherein the means for determining the link to the second social networking service chat page comprises means for receiving the link from the agent service over a network.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method for redirecting a digital communication, the method comprising:
   receiving, from a social networking service and during a conversation between a chatbot of a chat service and a user on a first chat page of the social networking service, a message entered into the first chat page of the social networking service, the message posted by a user, and the message received, by the chat service, through a callback web address of the chat service provided to the social networking service;
   processing the message using natural language processing;
   detecting a handoff condition during the processing of the message;
   determining, based upon detecting the handoff condition, that the chat on the first chat page of the social networking service should be handed off from an automated chatbot to a human agent, the handoff condition comprising one or more of:
presence of a keyphrase;
presence of a key word;
an inability to determine a meaning of the message; or
an inability to provide an answer to the message that is above a predetermined level of confidence in answering the message;
determining a hyperlink to a second chat page of the social networking service, the second chat page of the social networking service registered to an agent service that routes communications with the second chat page of the social networking service to the human agent, the hyperlink linking to a Universal Resource Locator (URL); and
causing the link to be posted to the first chat page of the social networking service as a message to the user and from the chat service by sending the hyperlink to the first chat page of the social networking service.

2. The method of claim 1, comprising:
receiving, from the social networking service, an earlier message before the message, the earlier message entered into the first chat page of the social networking service, the earlier message posted by the user, the earlier message received through the callback web address provided to the social networking service;
processing the earlier message;
determining from the earlier processed message that the handoff condition is not indicated;
determining a response to the earlier process message, the response generated without human intervention; and
sending the response to the social networking service for posting to the first chat page.

3. The method of claim 2, comprising:
receiving content from an information service over a network; and
inserting the content into the response.

4. The method of claim 3, wherein the information service is an account information service and the content is information on an account of the user at the information service.

5. The method of claim 1, wherein determining from the processed message that the handoff condition is indicated in the message comprises:
inputting the processed message to a machine learning algorithm; and
receiving an output of the machine learning algorithm indicating that the handoff condition is indicated.

6. The method of claim 5, comprising:
training the machine learning algorithm with past chat logs annotated indicating a handoff condition.

7. The method of claim 1, wherein determining the hyperlink to the second chat page of the social networking service comprises receiving the hyperlink from the agent service over a network.

8. A non-transitory machine-readable medium comprising instructions for causing a redirection of a digital communication, the instructions, when executed by a machine, causing the machine to perform operations comprising:
receiving, from a social networking service and during a conversation between a chatbot of a chat service and a user on a first chat page of the social networking service, a message entered into the first chat page of the social networking service, the message posted by a user, and the message received, by the chat service, through a callback web address of the chat service provided to the social networking service;
processing the message using natural language processing;
detecting a handoff condition during the processing of the message;
determining, based upon detecting the handoff condition, that the chat on the first chat page of the social networking service should be handed off from an automated chatbot to a human agent, the handoff condition comprising one or more of:
presence of a keyphrase;
presence of a key word;
an inability to determine a meaning of the message; or
an inability to provide an answer to the message that is above a predetermined level of confidence in answering the message;
determining a hyperlink to a second chat page of the social networking service, the second chat page of the social networking service registered to an agent service that routes communications with the second chat page of the social networking service to the human agent, the hyperlink linking to a Universal Resource Locator (URL); and
causing the link to be posted to the first chat page of the social networking service as a message to the user and from the chat service by sending the hyperlink to the first chat page of the social networking service.

9. The machine-readable medium of claim 8, wherein the operations further comprise:
receiving, from the social networking service, an earlier message before the message, the earlier message entered into the first chat page of the social networking service, the earlier message posted by the user, the earlier message received through the callback web address provided to the social networking service;
processing the earlier message;
determining from the earlier processed message that the handoff condition is not indicated;
determining a response to the earlier process message, the response generated without human intervention; and
sending the response to the social networking service for posting to the first chat page.

10. The machine-readable medium of claim 9, wherein the operations further comprise:
receiving content from an information service over a network; and
inserting the content into the response.

11. The machine-readable medium of claim 10, wherein the information service is an account information service and the content is information on an account of the user at the information service.

12. The machine-readable medium of claim 8, wherein the operations of determining from the processed message that the handoff condition is indicated in the message comprises:
inputting the processed message to a machine learning algorithm; and
receiving an output of the machine learning algorithm indicating that the handoff condition is indicated.

13. The machine-readable medium of claim 12, wherein the operations further comprise:
training the machine learning algorithm with past chat logs annotated indicating a handoff condition.

14. The machine-readable medium of claim 8, wherein the operations of determining the hyperlink to the second chat page of the social networking service comprises receiving the hyperlink from the agent service over a network.

15. A computing device comprising:

a processor;

a memory, the memory storing instructions, which when executed by the processor, cause the processor to perform operations comprising:

receiving, from a social networking service and during a conversation between a chatbot of a chat service and a user on a first chat page of the social networking service, a message entered into the first chat page of the social networking service, the message posted by a user, and the message received, by the chat service, through a callback web address of the chat service provided to the social networking service;

processing the message using natural language processing;

detecting a handoff condition during the processing of the message;

determining, based upon detecting the handoff condition, that the chat on the first chat page of the social networking service should be handed off from an automated chatbot to a human agent, the handoff condition comprising one or more of:

presence of a keyphrase;

presence of a key word;

an inability to determine a meaning of the message; or an inability to provide an answer to the message that is above a predetermined level of confidence in answering the message;

determining a hyperlink to a second chat page of the social networking service, the second chat page of the social networking service registered to an agent service that routes communications with the second chat page of the social networking service to the human agent, the hyperlink linking to a Universal Resource Locator (URL); and causing the link to be posted to the first chat page of the social networking service as a message to the user and from the chat service by sending the hyperlink to the first chat page of the social networking service.

16. The computing device of claim 15, wherein the operations further comprise:

receiving, from the social networking service, an earlier message before the message, the earlier message entered into the first chat page of the social networking service, the earlier message posted by the user, the earlier message received through the callback web address provided to the social networking service;

processing the earlier message;

determining from the earlier processed message that the handoff condition is not indicated;

determining a response to the earlier process message, the response generated without human intervention; and sending the response to the social networking service for posting to the first chat page.

17. The computing device of claim 16, wherein the operations further comprise:

receiving content from an information service over a network; and inserting the content into the response.

18. The computing device of claim 17, wherein the information service is an account information service and the content is information on an account of the user at the information service.

19. The computing device of claim 15, wherein the operations of determining from the processed message that the handoff condition is indicated in the message comprises:

inputting the processed message to a machine learning algorithm; and receiving an output of the machine learning algorithm indicating that the handoff condition is indicated.

20. The computing device of claim 19, wherein the operations further comprise:

training the machine learning algorithm with past chat logs annotated indicating a handoff condition.

* * * * *